(12) United States Patent
Yamamoto et al.

(10) Patent No.: US 7,684,300 B2
(45) Date of Patent: *Mar. 23, 2010

(54) OPTICAL INFORMATION RECORDING AND REPRODUCING APPARATUS

(75) Inventors: Hiroki Yamamoto, Hitachi (JP); Takeshi Maeda, Koganei (JP)

(73) Assignee: Hitachi, Ltd., Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 11/623,764

(22) Filed: Jan. 17, 2007

(65) Prior Publication Data

US 2007/0177476 A1 Aug. 2, 2007

(30) Foreign Application Priority Data

Feb. 2, 2006 (JP) ............................. 2006-025487

(51) Int. Cl.
G11B 7/00 (2006.01)

(52) U.S. Cl. ................. 369/59.11; 369/53.26; 369/116; 369/47.5

(58) Field of Classification Search .............. 369/53.31, 369/59.22, 59.23, 59.11, 53.26, 116, 47.5–47.53
See application file for complete search history.

(56) References Cited

U.S. PATENT DOCUMENTS

| | | | |
|---|---|---|---|
| 6,282,165 B1 * | 8/2001 | Koyama et al. | ............. 369/118 |
| 6,410,115 B1 * | 6/2002 | Tsai et al. | .................. 428/64.1 |
| 6,707,766 B2 * | 3/2004 | Mori et al. | ............... 369/13.08 |
| 6,754,140 B2 * | 6/2004 | Tanaka | .................... 369/13.43 |
| 6,901,036 B2 * | 5/2005 | Tominaga et al. | ........ 369/44.24 |
| 2003/0002428 A1 * | 1/2003 | Cheong et al. | ........... 369/275.2 |
| 2005/0213487 A1 * | 9/2005 | Yamamoto et al. | .......... 369/288 |
| 2006/0164960 A1 * | 7/2006 | Poon et al. | ............. 369/124.01 |

FOREIGN PATENT DOCUMENTS

| | | |
|---|---|---|
| JP | 10-040547 | 2/1998 |
| JP | 10-340482 | 12/1998 |
| JP | 2003-162843 | 6/2003 |
| JP | 2004-152392 | 5/2004 |
| JP | 2005-025848 | 1/2005 |
| JP | 2005-222673 | 8/2005 |

OTHER PUBLICATIONS

English Translation of JP 10-040547, Feb. 1998.*

* cited by examiner

*Primary Examiner*—Thang V Tran
*Assistant Examiner*—Brenda Bernardi
(74) *Attorney, Agent, or Firm*—Antonelli, Terry, Stout & Kraus, LLP.

(57) ABSTRACT

An optical information recording and reproducing apparatus comprises an optical disk having a reflection layer, an optical information recording layer, a super resolution layer and a protection layer on the recording surface of a substrate, a laser emission control unit for emitting the laser light to record and reproduce the optical information and changing the pulse-like emission pattern, a pickup for radiating by focusing the laser light and receiving the reflected light, a spindle and a spindle motor for supporting and rotationally driving the optical disk, and a reproduction signal processing unit for arithmetically processing the received signal.

7 Claims, 11 Drawing Sheets

WAVEFORM OBTAINED FROM REPRODUCTION SIGNAL AT TIME OF PULSE EMISSION

WAVEFORM OBTAINED BY INTERPOLATING REPRODUCTION SIGNALS AT TIME OF BIAS EMISSION UPON PULSE GENERATION (REPRODUCTION SIGNAL AT TIME OF PULSE EMISSION) - a (WAVEFORM OBTAINED BY INTERPOLATING REPRODUCTION SIGNALS AT TIME OF BIAS EMISSION UPON PULSE GENERATION)

OPTICAL INFORMATION RECORDING AND REPRODUCING APPARATUS

BACKGROUND OF THE INVENTION

This invention relates to an optical information recording and reproducing apparatus, or in particular to an optical information recording and reproducing apparatus high in recording density and having a high super resolution effect.

With the recent progress of the information society using optical telecommunication, the construction of a telecommunication system capable of high-speed communication of information high in recording density has been required. An optical information recording and reproducing apparatus capable of accumulating the optical information of high recording density is an indispensable optical device for developing the high-speed optical telecommunication of high recording density. Further, with the digitization of video information such as TV images and the increased image quality such as high definition, it is of urgent necessity to develop an information recording and reproducing apparatus of high recording density capable of long-time recording while maintaining a high image quality.

Currently, a DVD having a capacity of 4.7 GB on each side finds wide applications as an optical information recording medium for handling high-density dynamic images such as computer and video information. The practical application of this DVD as a rewritable recording and reproducing medium as well as a read-only ROM (DVD-ROM) with information written directly in the substrate has been promoted. The development of these optical information recording media is aimed at a high recording density, and the laser light having a shorter wavelength of 650 nm than the laser (780 nm) for the CD is used as a means to achieve the high density information recording. For applications to the computer graphics and the digital high-definition images involving the information of large recording capacity, however, the recording density four to five times higher is required. In order to meet this requirement, an optical disk using a blue semiconductor laser still shorter in wavelength (405 nm) and having the recording density of 23.3 GB on one side has been developed and found practical applications.

As a technique to further increase the recording density of the optical disk, the development of a multilayer recording method, a multi-valued recording method and a super resolution recording method is under way. Of these next-generation methods to achieve a high recording density, the super resolution recording method is one of the most promising techniques.

In the super resolution recording method, the waist of the laser beam radiated on the recording surface is reduced using the laser focusing function or the masking function of the super resolution layer. This is one of the recording methods of high density recording realized by the reversible change in the optical constants (refractive index (n) and the extinction coefficient (k)) of the super resolution layer formed in a multilayer structure such as the recording layer, the protection layer or the reflection layer of the optical disk. The super resolution layer, upon radiation of the read/write laser thereon, is excited by the temperature rise or the absorption of photons of light. As long as the laser is radiated, therefore, the refractive index and the extinction coefficient are changed reversibly, while the original state is restored upon extinction of the laser. In the optical disk, a recording portion and a non-recording portion are determined for reproduction by the amount of the laser light returned to the pickup after being radiated and reflected on the optical disk. Due to this reversible change of the optical constants in the super resolution layer, the area of the light returned to the pickup can be reduced more than the normal radiation area of the laser light. Specifically, the resolution can be improved by reducing the readable area using the optical masking effect.

The extinction coefficient (k) is a quantity proportional to the light absorption coefficient of a material, and assumes a larger value the larger the absorption coefficient of the material. The two constants including the refractive index (n) and the absorption coefficient (k) are collectively called the optical constants.

In the prior art, as described in JP-A-10-340482, for example, a thin film material of cobalt oxide has been used as the super resolution layer. The large change in refractive index and the super resolution effect of this thin film can produce an optical disk of high recording density.

In the optical information recording and reproducing apparatus currently available, the optical information is reproduced by radiating the continuous wave (CW) light or the reproducing laser light superposed with high frequencies of about 400 MHz. In the case where the the complex refractive index of the super resolution layer is changed and the power of the reproducing light is increased until the super resolution effect is obtained, therefore, heat is accumulated on the optical information recording medium by the radiation of laser light, and a broad heat distribution occurs in the laser beam spot, thereby posing the problem that a super resolution mask high in contrast cannot be formed. Further, the heat accumulation degradate the film or the recording pit on the medium, resulting in the degradation of the repetitive reproducing operation characteristic.

A reproducing method with pulse light for improving the super resolution effect by avoiding the heat accumulation in the medium and steepening the temperature gradient in the beam spot is described, for example, in JP-A-10-40547.

In an application of the pulse reproducing method as described in JP-A-10-40547, a high response of the material is essential. Also, the beam spot in super resolution state, which is a superposition of a beam spot in ground state and a beam spot in super resolution state, is affected by the beam spot in ground state, and a satisfactory super resolution mask is difficult to obtain.

SUMMARY OF THE INVENTION

The object of this invention is to provide an optical information recording medium formed with a super resolution film having a high response and a thermal stability and an optical information recording and reproducing apparatus capable of producing a high super resolution effect using the medium.

In order to achieve the object described above, according to this invention, there is provided an optical information recording and reproducing apparatus comprising at least a substrate, a reflection layer formed on the recording surface of the substrate, an optical information recording layer, a super resolution layer having the complex refractive index reversibly changing with temperature, an optical information recording medium having a protection layer, a laser emission control unit for emitting the laser light adapted to record or reproduce the optical information in the optical information recording medium and to change the laser emission pattern, a pickup for radiating by focusing the laser light on the surface of the optical information recording medium and receiving the light reflected from the optical information recording medium, a spindle and a spindle motor for supporting and rotationally driving the optical information recording medium, and a reproduction signal processing unit for arithmetically processing the received signal, wherein the laser light is emitted in pulses by the laser emission control unit, and the reproduction signal processing unit acquires the reproduction signal from the pulse emitting portion and the bias emitting portion of the pulse light and produces, as a reproduction signal, the result of arithmetically processing the reproduction signal from the pulse emitting portion with reference to the reproduction signal in the bias emitting portion.

The arithmetic process described above is intended to produce the difference between the reproduction signal from the pulse emitting portion and and a constant multiple of the reproduction signal from the bias emitting portion. Also, the arithmetic process is executed after determining the reproduction signal of the bias emitting portion at the same time point as the reproduction signal of a given pulse emitting portion by interpolating the reproduction signals of the adjoining bias emitting portions temporally before and after the reproduction signal of the particular given pulse emitting portion.

The pulse emitting portion of the super resolution layer is in super resolution state but not the bias emitting portion thereof.

The super resolution state is defined as a state in which a part of the laser spot is masked and the optical resolution is increased by the change in the optical constants due to the laser radiation and the resulting temperature increase of the super resolution layer. The state not in the super resolution state, on the other hand, is called the ground state.

The super resolution layer contains $Fe_2O_3$, $Co_3O_4$, NiO, CoO, ZnO, $Cr_2O_3$, ZnS—ZnSe, GaN—InN and $Ga_2O_3$, and preferably contains $Fe_2O_3$ and $Ga_2O_3$. Further, the optical information recording layer is a metal film configured of one or more metal elements selected from Ag, In, Ge, Sb and Te.

The optical information recording and reproducing apparatus using the pulse reproducing method according to this invention can reproduce, with a high efficiency, the optical information recording medium formed with a super resolution film, and an optical disk having a high resolution against a small recording mark can be fabricated. Thus, the applicability of this optical information recording and reproducing apparatus is very high.

In the optical information recording and reproducing apparatus according to this invention, the laser light shaped into pulses of the emission frequency higher than the shortest mark frequency is radiated on the optical information recording medium having a super resolution layer of high-speed response capable of following the pulse width. At the same time, the optical signals are detected from the pulse emitting portion and the bias emitting portion not emitting the pulse light, and the result of the arithmetic operation performed with these signals is used as a reproduction signal. Therefore, a super resolution mask having a large contrast can be formed. As a result, the optical information recording and reproducing apparatus higher in recording density than in the prior art can be obtained. Further, the temperature can be increased without deteriorating the super resolution layer or other optical information recording media, thereby producing an optical information recording and reproducing apparatus higher in reliability than in the prior art.

Other objects, features and advantages of the invention will become apparent from the following description of the embodiments of the invention taken in conjunction with the accompanying drawings.

DETAILED DESCRIPTION OF THE INVENTION

An optical information recording apparatus having the recording density more than 1.5 times that of the prior art has been obtained by using an optical information recording medium containing $Fe_2O_3$ or $Ga_2O_3$ as a super resolution layer and, as a reproduction signal, the difference between the reproduction signal from the pulse emitting portion and the reproduction signal from the bias emitting portion, which has the pulse width of 3 ns, the pulse period of 8 ns, the emitting power of 6 mW for the pulse emitting portion and the emitting power of less than 0.8 mW for the bias emitting portion with no pulse radiation.

Embodiment 1

Figure 1:
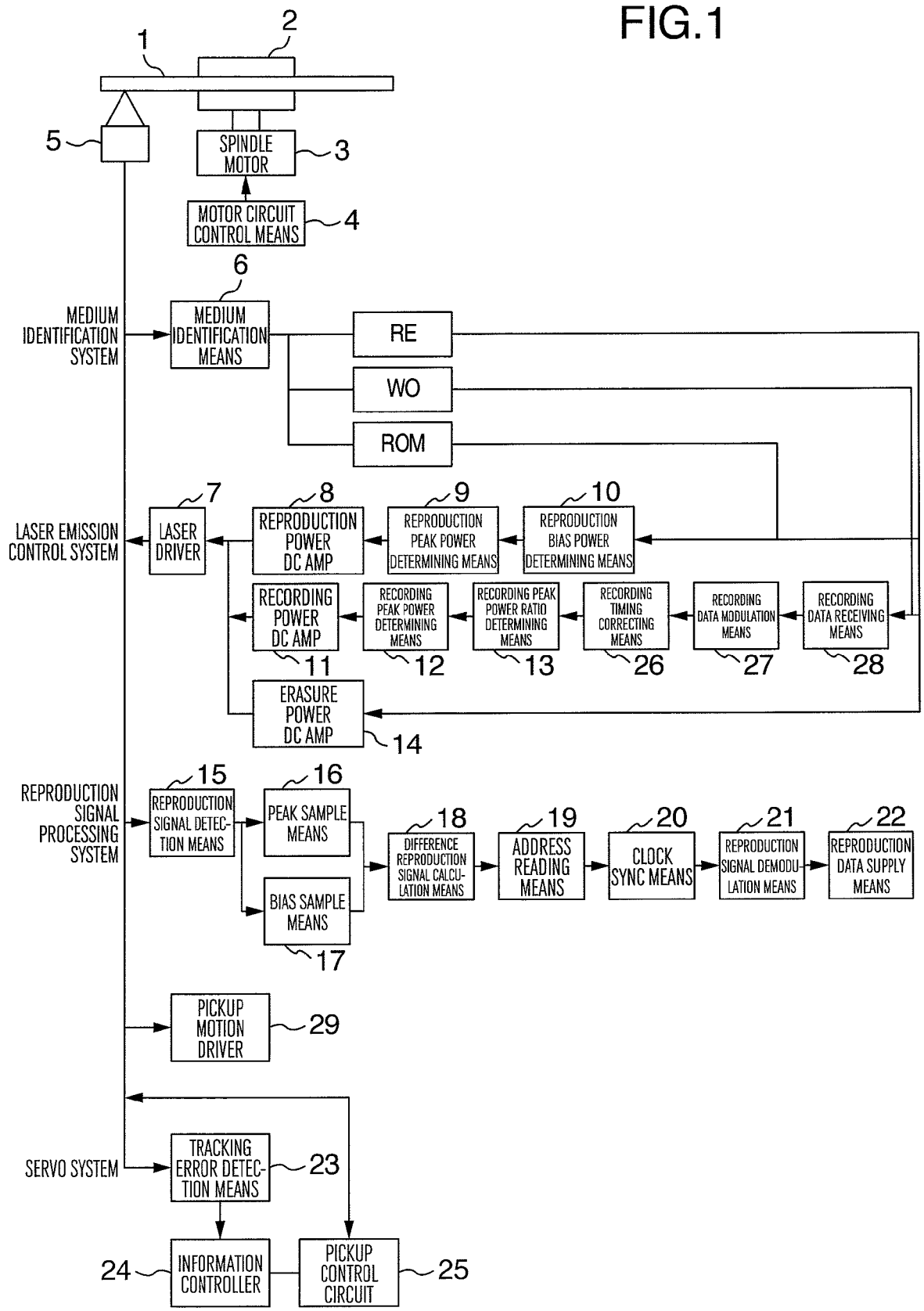
FIG. 1 is a block diagram showing an optical information recording and reproducing apparatus fabricated by the method according to this invention.

An optical information recording and reproducing apparatus for recording and reproducing the optical information recording medium according to the invention has been fabricated. FIG. 1 is a block diagram showing the optical information recording and reproducing apparatus thus fabricated. In FIG. 1, reference numeral 1 designates an optical information recording medium (hereinafter referred to as the optical disk), numeral 2 a spindle, numeral 3 a spindle motor, numeral 4 a motor circuit control means, numeral 5 a pickup, numeral 6 a medium identifying means, numeral 7 a laser driver, numeral 8 a reproducing power DC amplifier, numeral 9 a reproducing peak power determining means, numeral 10 a reproducing bias power determining means, numeral 11 a recording power DC amplifier, numeral 12 a recording peak power determining means, numeral 13 a recording peak power ratio determining means, numeral 14 an erasing power DC amplifier, numeral 15 a reproduction signal detection means, numeral 16 a peak sample means, numeral 17 a bias sample means, numeral 18 a difference reproduction signal calculation means, numeral 19 an address reading means, numeral 20 a clock sync means, numeral 21 a reproduction signal demodulation means, numeral 22 a reproduction data supply means, numeral 23 a tracking error detection means, numeral 24 an information controller, numeral 25 a pickup control circuit, numeral 26 a recording timing correcting means, numeral 27 a recording data modulation means, numeral 28 a recording data receiving means, and numeral 29 a pickup motion driver.

The optical information recording and reproducing apparatus according to the invention includes the medium identifying means 6 for identifying the type of the optical disk 1 as a recording medium which is classified into the rewritable (RW) type, the write-once (WO) type and the read-only memory (ROM). In the laser emission control system described below, only the reproducing system is driven in the case where the optical disk inserted is the ROM, the reproducing system and the recording system in the case where the optical disk inserted is of WO type, and the reproducing system, the recording system and the erasing system in the case where the optical disk inserted is of RW type. The optical disk 1 is fixed provisionally on a rotary mechanism connected, directly or indirectly, to the rotary shaft of the spindle motor 3 fixed on the spindle 2 and controlled by the motor circuit control means 4. The information on the optical disk is read as an optical signal by the sensor for detecting the laser providing the light source of the pickup 5 and the reflected light. Also, the information is stored in the optical disk by the light source in the pickup. Also, the pickup is set in position along a track by the pickup motion driver 29.

The laser emission control unit is classified into the reproducing system, the recording system and the erasing system. The reproducing system includes the reproducing power DC amplifier 8, the reproducing peak power determining means 9 and the reproducing bias power determining means 10 for pulse reproduction according to the invention. Thus, the pulse reproduction waveform of the reproduction light is formed, and the emission pattern is sent to the laser driver 7 and the pickup 5 thereby to emit the laser in pulse form.

At the time of recording the data in the recording system, the recording data is input from the recording data receiving means 28 and modulated by the recording data modulation means 27. The data thus modulated is input to the laser driver 7 through the recording timing correcting means 26 thereby to control the light source in the pickup 5. The output of the recording peak power ratio determining means 13 is input to the pickup 5 through the recording power determining means 12, the recording power DC amplifier 11 and the laser driver 7 thereby to control the light source in the pickup 5. Further, in the erasing system, the recording data is input to the laser driver 7 through the erasing power DC amplifier 14 thereby to control the light source in the pickup 5.

The optical signal obtained at the time of reproduction is processed in the reproduction signal processing system. The optical information detected by the reproduction signal detection means 15 are sampled by the peak sample means 16 and the bias sample means 17 for the pulse emitting portion and the bias emitting portion separately. These two signals are arithmetically processed by the difference reproduction signal calculation means 18. The signals thus processed are output externally by the reproduction data supply means 22 through the address reading means 19, the clock sync means 20 and the reproduction signal demodulation means 21. The reproduction data is output by a predetermined output means such as a display unit or a speaker or processed by an information processing system such as a personal computer.

The focal point and the focal depth vary from one optical disk to another, and therefore, an optical disk having the auto focusing function was selected. Further, in keeping with the configuration in which the a focusing function layer is mounted on the disk and the tracking width is narrowed, a tracking error detection means 23 for high density recording was added to make possible the tracking suitable for an arbitrary medium. The information from the tracking error detection means 23 is transmitted to the pickup 5 through the information controller 24 and the pickup control circuit 25. Also, the mechanism for identifying a medium type utilizing the reflectivity difference between media was employed to make the auto tracking possible in accordance with the difference in medium type.

The laser light source mounted on the pickup has the wavelength of 405 nm. Also, the objective lens for focusing the laser beam on the optical disk has the NA (numerical aperture) of 0.85.

Figure 2:
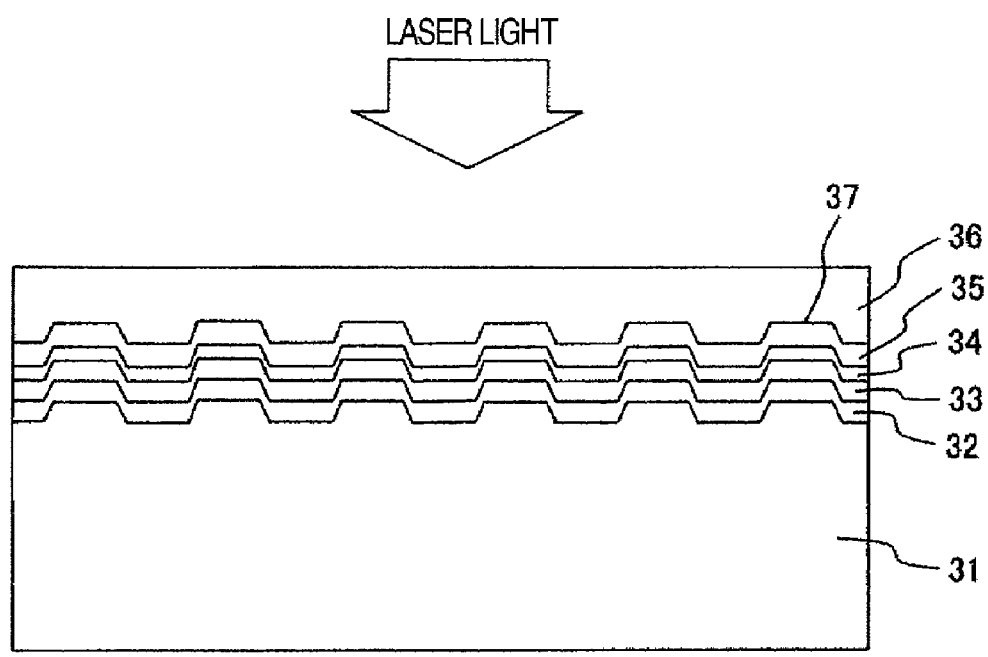
FIG. 2 is a sectional view schematically showing a ROM-type optical information recording medium fabricated by the method according to this invention.

The characteristic of the optical information recording medium having the super resolution effect according to the invention was evaluated using the optical information recording and reproducing apparatus shown in FIG. 1. First, the read-only ROM disk was evaluated. A sectional view of the ROM-type optical information recording medium fabricated is shown in FIG. 2. In FIG. 2, numeral 31 designates a substrate, numeral 32 a reflection layer, numerals 33, 35 protection layers, numeral 34 a super resolution layer, numeral 36 a cover layer, and numeral 37 a recording pit. In the ROM-type optical information recording medium according to this embodiment, the recording pit 37 has the function as an optical information recording layer. According to this embodiment, a medium structure suitable for the optical system having the laser wavelength of 405 nm and the numerical aperture of 0.85 was realized by using a polycarbonate substrate 31 having the outer diameter of 120 mmφ, the inner diameter of 15 mmφ and 1.1 mm thick, and the cover layer 36 of a polycarbonate sheet having the outer diameter of 119.5 mmϕ, the inner diameter of 23 mmϕ and 0.1 mm thick. The reproducing laser is focused from the cover layer 36 side for reproduction.

The ROM disk was fabricated by the processes described below. First, a recording pit pattern having mark spaces at predetermined intervals was formed on a photo resist using a laser drawing unit. After that, the pit pattern was copied to a Ni die, and a substrate was formed by ejection molding of polycarbonate using this die. The minimum pit size was 139 nm, and the pit depth 22 nm. Also, the track pitch was 320 nm.

A reflection film of an alloy containing 95% Ag, 2.5% Pd and 2.5% Cu (mol %) was formed as the reflection layer 32 on the substrate thus fabricated. The film thickness was 20 nm. The film was formed by DC magnetron sputtering using the pure Ar gas. An amorphous film containing 80% ZnS and 20% $SiO_2$ (mol %) was used as the protection layers 33, 35, which were formed by RF sputtering using the pure Ar gas. A film containing 50% $Fe_2O_3$ and 50% $Ga_2O_3$ (mol %) was used as the super resolution layer 34. This layer was formed by RF sputtering using a gas containing 95% Ar and 5% $O_2$ (flow rate %). An oxide target having the same composition as described above was used as a sputtering target to form the super resolution layer.

After forming these layers by sputtering, the cover layer 36 was formed. The UV-curable resin was applied, by spin coating, on the substrate 1.1 mm formed with a film, and a polycarbonate cover layer cut to a circle having the outer diameter of 119.5 mmϕ, the inner diameter of 23 mmϕ and the thickness of 0.085 mm was attached thereon. The resulting assembly was introduced into a vacuum chamber and while being deaired to a vacuum of about 1 Pa, the sheet and the substrate were closely attached to each other. The UV-curable resin was cured by radiating the UV light from the cover layer side. The thickness of the UV-curable resin was adjusted to the total thickness of 0.1 mm including the UV-curable resin and the cover layer.

According to this embodiment, a polycarbonate substrate 1.1 mm thick was used as the substrate 31. The outer diameter of the substrate 1 is 120 mm, and a hole having the inner diameter of 15 mm was formed for the chuck. On this substrate, the recording pit 37 for the CN ratio test was formed of steps on the same track at predetermined period with the space.

The recording pits corresponding to the recording signals of 2T, 3T, . . . , 8T and the spaces are repeatedly recorded with the clock signal (1T=69.5 nm). Only one type of recording signal is formed on the same track, and different signals are recorded on different tracks. In this case study, the length of the recording pit of the 2T signal providing the shortest mark is 139 nm, and the length of the recording pit for the 8T signal providing the longest mark is 556 nm.

Further, a mirror surface portion in the shape of a ring concentric with the optical disk and having no recording pit is formed on the substrate 1. This mirror surface portion is called the mirror surface. By measuring the amount of light reflected from the mirror surface, the nonlinearity of the super resolution layer 34 can be evaluated.

The output of the repetitive signal described above is observed by oscilloscope, and it can be concluded that the larger the ratio (resolution) of the amplitude of the fine mark such as 2T and 3T to the signal amplitude based on the longest mark (8T), the higher the resolution of the shortest mark.

According to this invention, the resolution (Mod) was defined by Equation (1) below.

$$Mod = \frac{I_{npp}}{I_{8pp}} \quad (1)$$

where $I_{8pp}$ is the amplitude ratio based on the longest mark and $I_{npp}$ the amplitude ratio of the mark nT (n: 2 to 7) to be measured.

Figure 3:
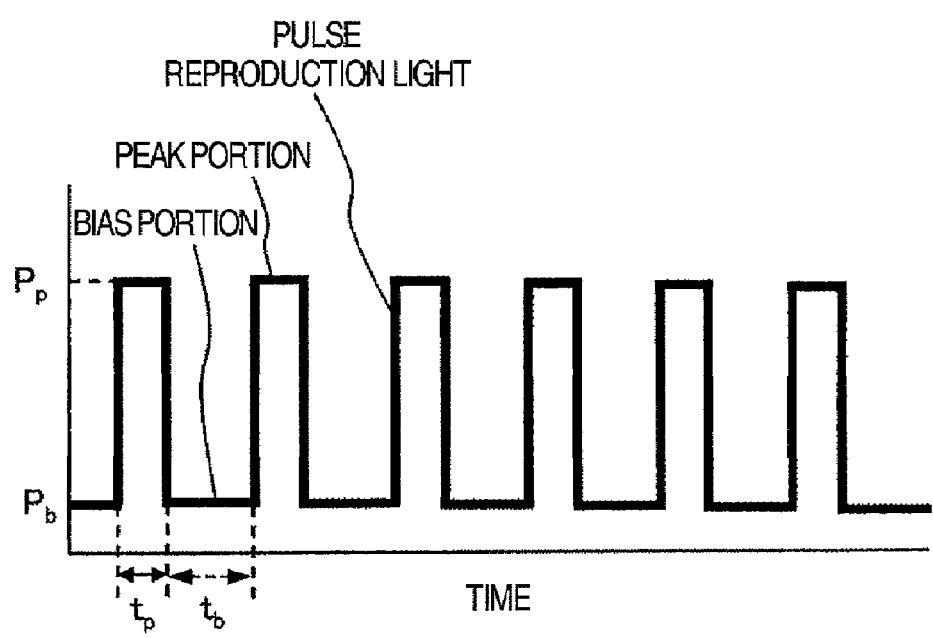
FIG. 3 is a schematic diagram showing the light emission pattern for pulse reproduction.

According to this invention, the reproducing operation was performed by radiating the pulse light on the optical information recording medium shown in FIG. 2. The emission pattern of the pulse light used in this invention is shown in FIG. 3. In FIG. 3, character Pp designates the emitting power of the pulse emitting portion and character Pb the emitting power of the bias emitting portion. Character tp designates the emission time of the pulse emitting portion, and character tb the emission time of the bias emitting portion. According to this embodiment, Pp is set to not less than 8 mW but not more than 6 mW and Pb to not less than 0.3 mW but less than 0.8 mW. By doing so, the pulse emitting portion can maintain the super resolution layer in super resolution state, and the bias emitting portion can be maintained in ground state.

Also, tp is set to 1 to 5 ns, and tb to 5 to 13 ns. Further, the linear speed of rotation of the optical disk is set to 4.56 m/s. As a result, the time during which the shortest 2T mark is passed is 30.5 ns, and in the case where tp is 3 ns and tb 5 ns, the sampling is possible with about 3.8 pulses.

Generally, even with the laser spot in super resolution state, the reflectivity associated with other than the super resolution state is not zero, and therefore, the signal not in super resolution state is added to the signal in super resolution state. As shown by Equation (2), the output in ground state with the bias emitting portion low in laser power and not associated with the super resolution state is arithmetically processed from the output in super resolution state with the pulse emitting portion high in emitting power and associated with the super resolution state. In this way, the signal output associated with only the super resolution state can be obtained.

The effective reproduction power Pr' for the pulse reproducing method was determined using Eequation (2) below.

$$P'_r = P_b + \frac{t_p}{(t_p + t_b)} \cdot P_p \quad (2)$$

A specific example of this arithmetic operation is explained in detail. The beam spot in super resolution state is considered to be formed as the sum of the linear beam spot not in super resolution state and the nonlinear beam spot in super resolution state. Basically, therefore, only the reproduction signal in super resolution state is obtained by subtracting the portion of the normal beam spot (normally, Gaussian distribution) from the whole beam spot in super resolution state. In order to obtain the suepr resolution state, the read laser light high in power is radiated, and therefore the beam spot intensity of the linear portion also increases. As a more accurate arithmetic operation to estimate the beam spot in super resolution state correctly, therefore, the difference is taken between the beam spot of the linear portion multiplied by a constant and the beam spot in super resolution state.

In the case where this reproducing method with the pulse signal is used, the highly accurate reproduction with super resolution is made possible by always sampling the normal beam spot not in super resolution state and referring to the nearest beam spot in super resolution state. A specific method is described below.

Figure 14:
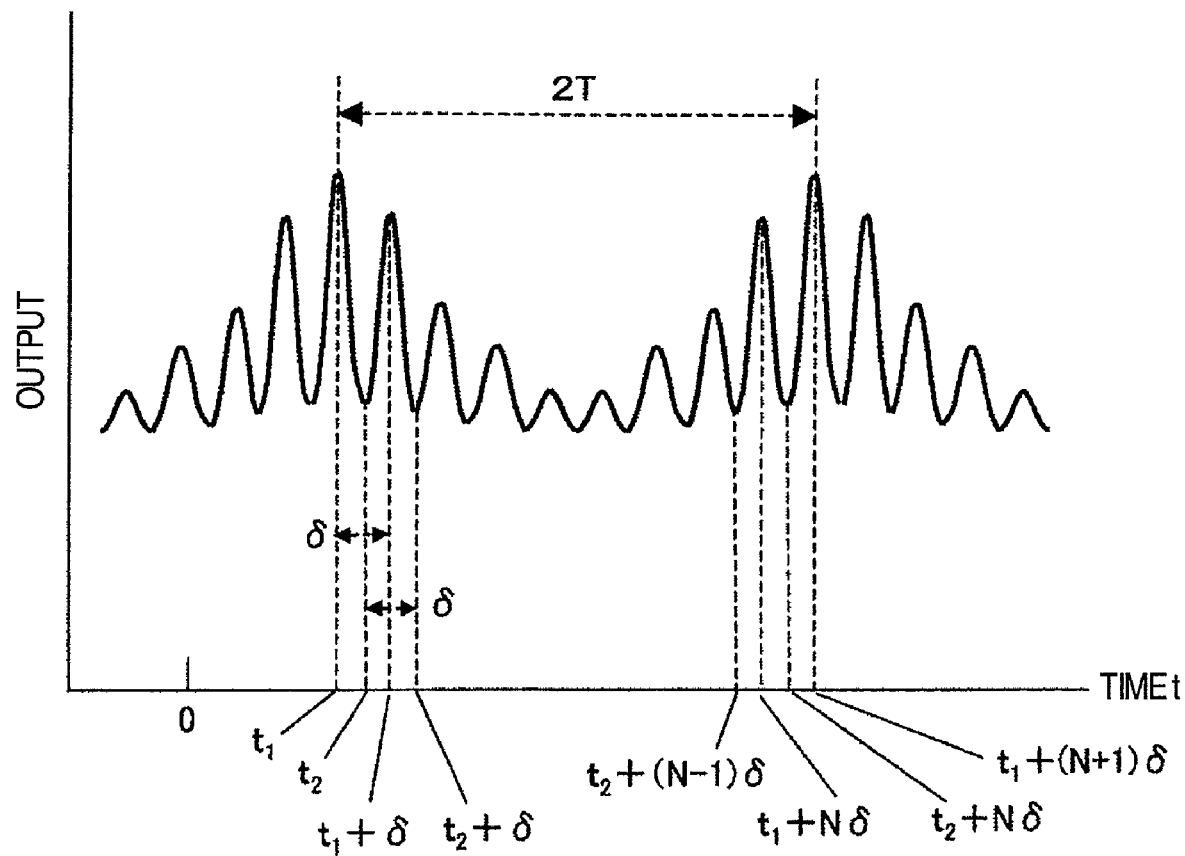
FIG. 14 is a diagram showing an example of the waveform obtained by pulse reproduction.
Figure 15A:
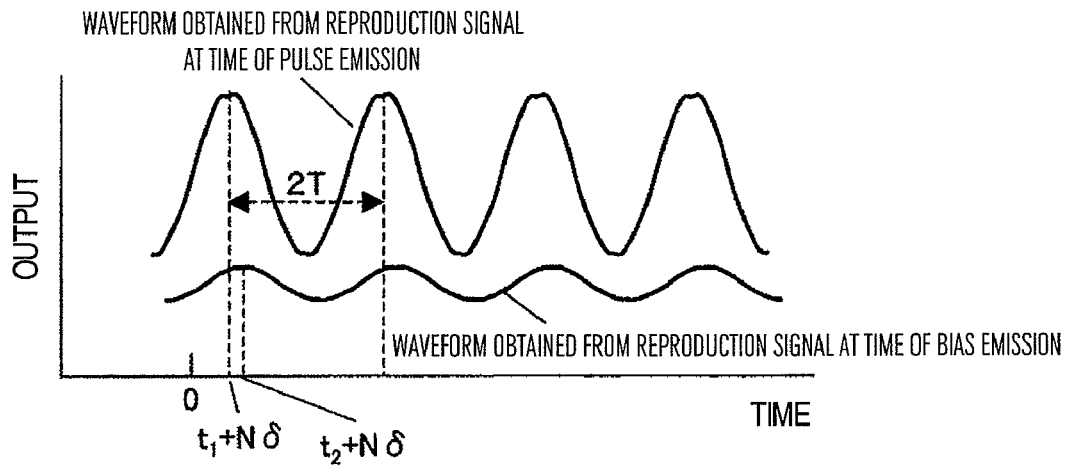
FIGS. 15A, 15B, 15C are diagrams showing an example of the waveform at the time of pulse emission and the bias emission and the waveform corrected and arithmetically processed.
Figure 15B:
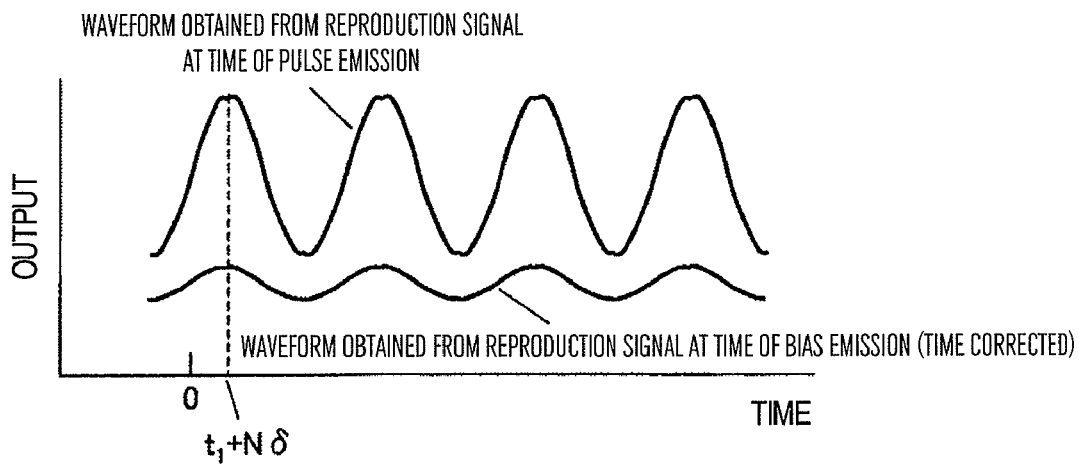
Figure 15C:
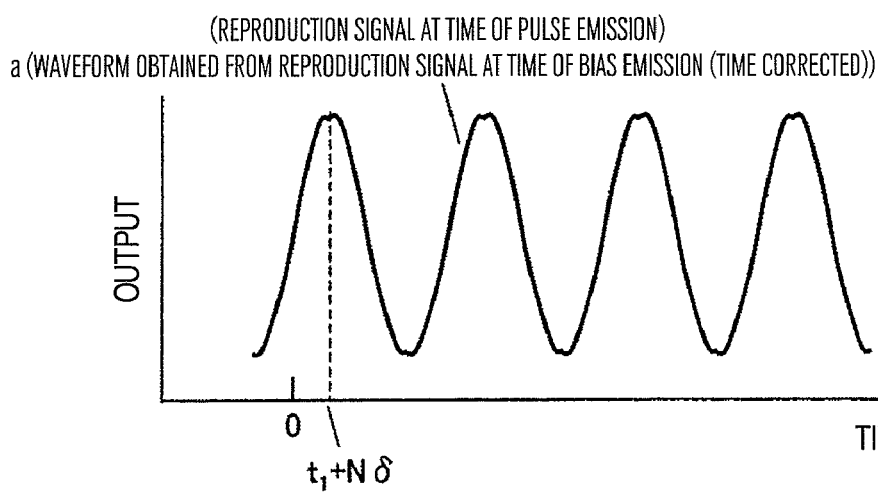

FIG. 14 shows an example of the waveform obtained by pulse reproduction. An example of reproducing the 2T repetitive signal is taken here. Assume that an arbitrary time point is 0, an arbitrary pulse emission time point $t_1$, the bias emission time point $t_2$, and the pulse emission period and the sampling period $\delta$. The pulse emission time points are given as $t_1, t_1+\delta, t_1+2\delta, \ldots t_1+N\delta, t_1+(N+1)\delta \ldots$. Also, the bias emission time points are given as $t_1, t_1+\delta, t_1+2\delta, \ldots t_1+N\delta, t_1+(N+1)\delta \ldots$. By sampling the output at each time point, the reproduction signals at the time of pulse emission and the bias emission are obtained. The waveforms obtained from only the time of pulse emission and only the time of bias emission are shown in FIG. 15A. The waveform obtained from the reproduction signal at the time of pulse emission and the waveform obtained from the reproduction signal at the time of bias emission are shifted from each other by the time $\{t_2+N\delta\}-\{t_1+N\delta\}=t_2-t_1$. The waveforms with this time shift corrected after forming each reproduction signal are shown in FIG. 15B. The waveform obtained by the arithmetic process of "(reproduction signal at the time of pulse emission)–a (reproduction signal at the time of bias emission)" from the two waveforms is shown in FIG. 15C, where a is a constant. This constant is determined in such a manner as to maximize the output of FIG. 15C and varies with the disk type, signal type or the relation of previous and following recording marks and spaces.

Figure 16:
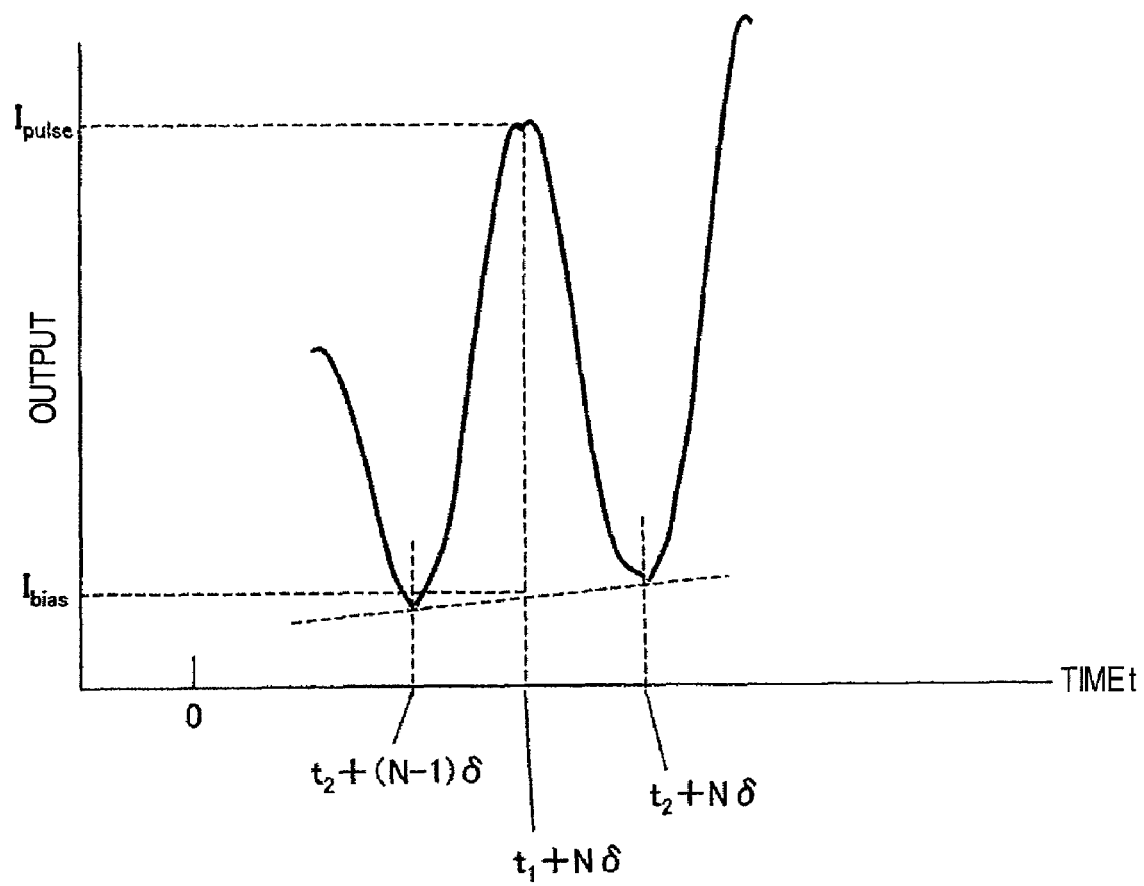
FIG. 16 is a schematic diagram showing the reproduction signal in the neighborhood of the reproduction signal at the time of the pulse emission at time $t+N\delta$.

In forming the waveforms of FIG. 15B from those of FIG. 15A by the arithmetic operation shown in FIGS. 15A, 15B, 15C, the reproduction signal at the time of bias emission may be inaccurate as it is not obtained from the output at the time point of $t_1+N\delta$. In such a case, the arithmetic operation shown in FIGS. 16 and 17 is performed. FIG. 16 is a schematic diagram showing the read out signal at the time of pulse emission at $t_1+N\delta$. The reproduction signal at the time of pulse emission at $t_1+N\delta$ is obtained by interpolation from the reproduction signals at the time of bias emission before and after the pulse emission at $t_1+N\delta$, i.e. from the reproduction signals at the time of bias emission at time points $t_2+N\delta$ and $t_2+(N+1)\delta$. For example, the reproduction signal at the time of bias emission at time point $t_1+N\delta$ is determined by using the output at the time of bias emission at time point $t_2+N\delta$ and the average value or root mean value at the time of bias emission at time point $t_2+(N+1)\delta$.

Figure 17A:
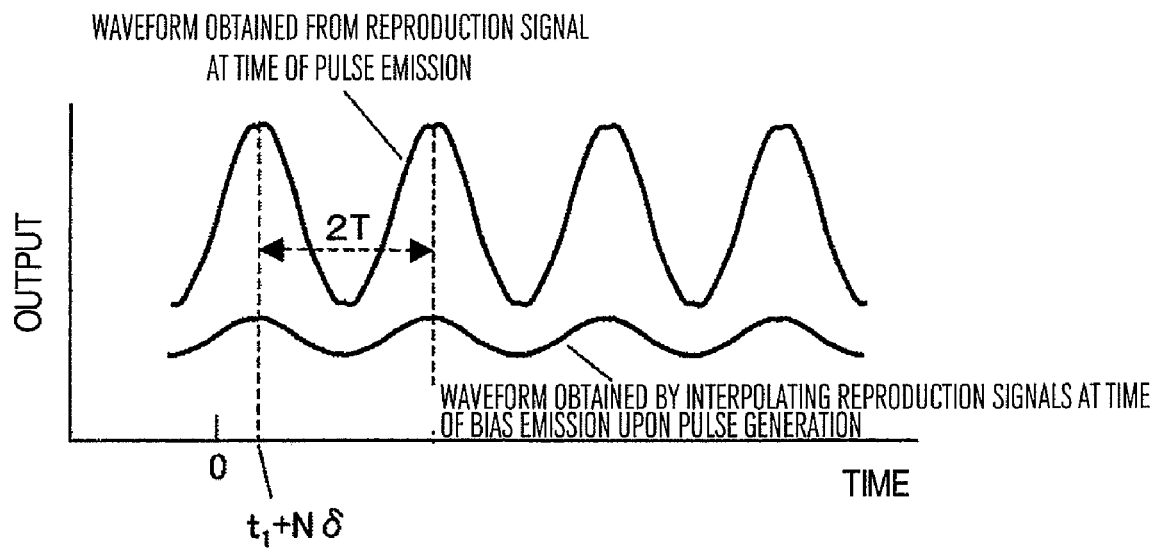
FIGS. 17A, 17B are diagrams showing an example of the waveform obtained from the reproduction signal of bias emission and the reproduction signal of pulse emission at time $t+N\delta$.
Figure 17B:
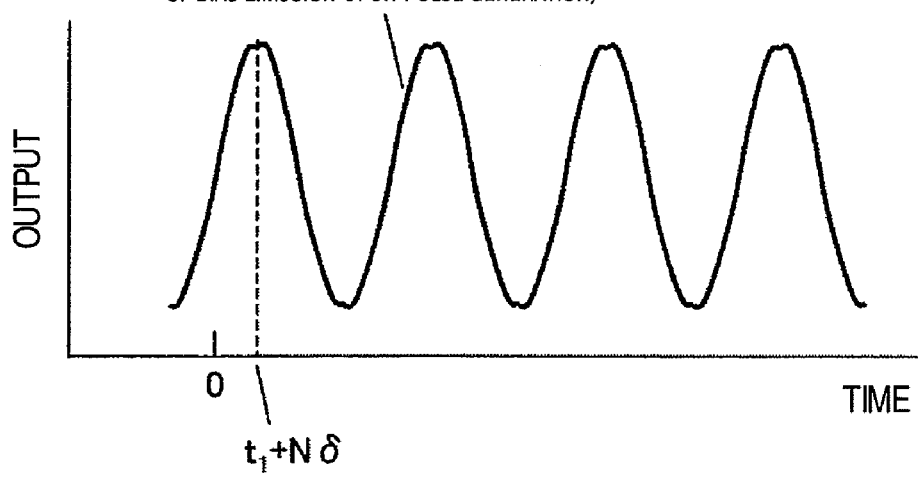

FIG. 17A shows the waveform of the reproduction signal at the time of bias emission determined in this manner and the waveform obtained from the reproduction signal at the time of pulse emission. Since the time is corrected as described above, the time shift shown in FIG. 15 is eliminated. Also, the waveform obtained by the arithmetic process "(reproduction signal at the time of pulse emission)–a (reproduction signal at the time of bias emission)" from the two waveforms obtained is shown in FIG. 17B, where a is a constant. This constant is determined in such a manner as to maximize the output of FIG. 17B and varies with the disk type, signal type or the relation between previous and following recording marks and spaces.

As described above, the aforementioned arithmetic process, which is intended to obtain the difference between the reproduction signal from the pulse emitting portion and the reproduction signal from the bias emitting portion, is executed preferably after determining, by interpolation, the reproduction signal of the bias emitting portion at the same time point as the reproduction signal of an arbitrary pulse emitting portion from the reproduction signals of the bias emitting portions immediately before and after the reproduction signal of the arbitrary pulse emitting portion. The super resolution layer is in super resolution state for the pulse reproduction emitting portion and not in super resolution state for the bias emitting portion.

Figure 5:
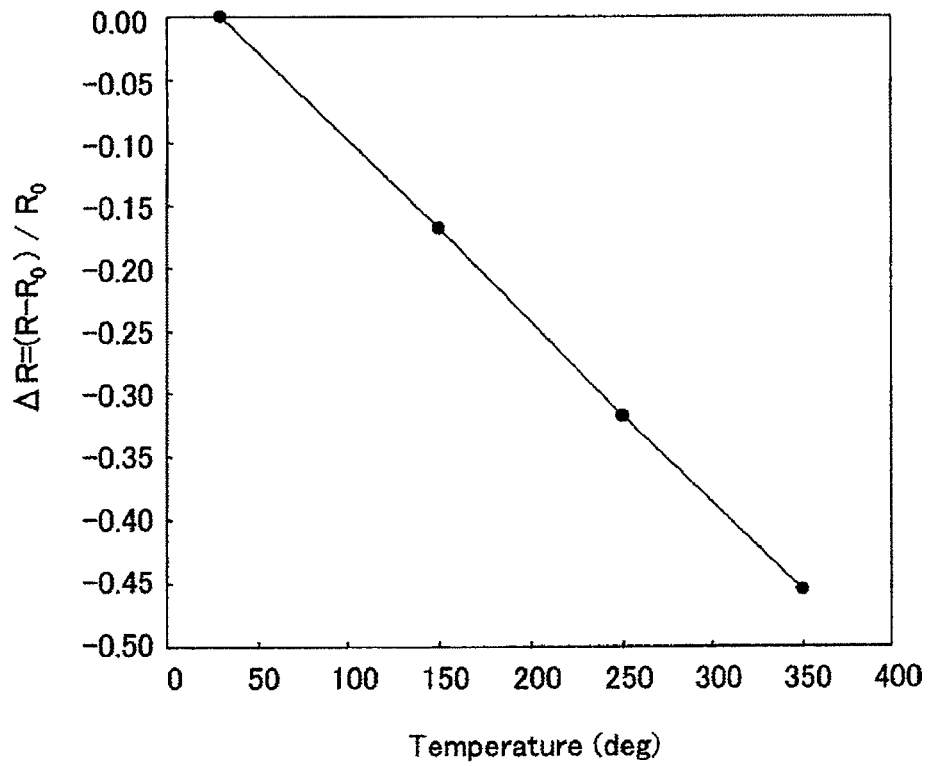
FIG. 5 is a diagram showing the temperature dependency of the reflectivity change rate $\Delta R$ in the case where a multi-layer film having the same structure as the ROM-type optical disk fabricated by the method according to the invention is heated.

First, as a preliminary study, a multilayer film similar to the film structure shown in FIG. 2 was formed on a glass substrate, and the reflectivity change with the temperature increase was determined. FIG. 5 shows the temperature dependency of the specific reflectivity change $\Delta R$ of the multilayer film having the film structure shown in FIG. 2. The specific reflectivity change $\Delta R$ was calculated from Equation (3) below assuming that the reflectivity at each temperature is R and the reflectivity at 30° C. is Ro.

$$\Delta R = \frac{R - R_0}{R_0} \quad (3)$$

In the film structure having the optical disk configuration shown in FIG. 2, the reflectivity was reduced with the temperature increase by heating at 350° C., and $\Delta R$ of −45.5% resulted.

Figure 6:
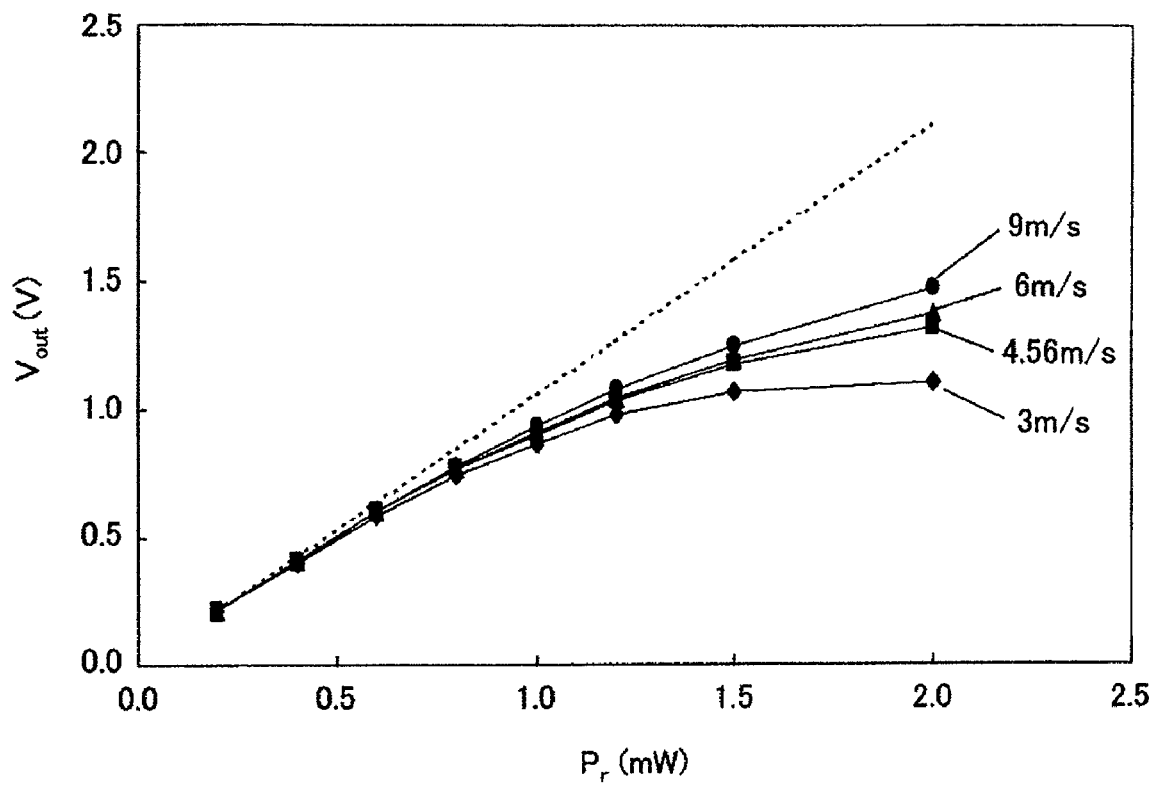
FIG. 6 is a diagram showing the reproduction power dependency of the reflection light intensity ($V_{out}$) on the mirror surface of the ROM-type optical disk fabricated by the method according to the invention.

FIG. 6 shows the reproduction power (Pr) dependency of the reflection light intensity on the mirror surface of the optical disk having the film structure of FIG. 2. The reflection light intensity was indicated by the output ($V_{out}$ (mV)) from the photodiode making up a photo detector. Also, the rotational linear speed of the disk was set to 3 to 9 m/s for measurement.

In FIG. 6, the dashed straight line is based on the assumption that the $V_{out}$ for each Pr is proportional to $V_{out}$ for Pr of 0.3 mW. In all rotational speeds, it is understood that $V_{out}$ increases substantially linearly up to Pr of about 0.7 mW, while $V_{out}$ is reduced below the linear line for 0.8 mW or more. In the film structure of this optical disk, therefore, the super resolution state is realized for Pr of 0.8 mW or more, while the ground state prevails for Pr of lower than 0.8 mW.

The smaller the rotational speed, the larger the degree of $V_{out}$ reduction. Especially, for the rotational linear velocity of 3 m/s, $V_{out}$ for Pr of 2.0 mW was about 50% of the value assumed for linear $V_{out}$. With the increase in Pr or with the decrease in rotational linear velocity, the laser light radiation amount per unit time increases and therefore, the temperature on the surface of the optical disk is considered to increase. As shown in FIG. 5, in the optical disk having the film structure of FIG. 2, the reflectivity decreases with the temperature increase, and therefore, the reflectivity is considered to decrease with the temperature increase due to laser radiation.

Next, the ROM-type optical disk was actually fabricated and the super resolution effect due to the pulse radiation was studied.

Figure 4:
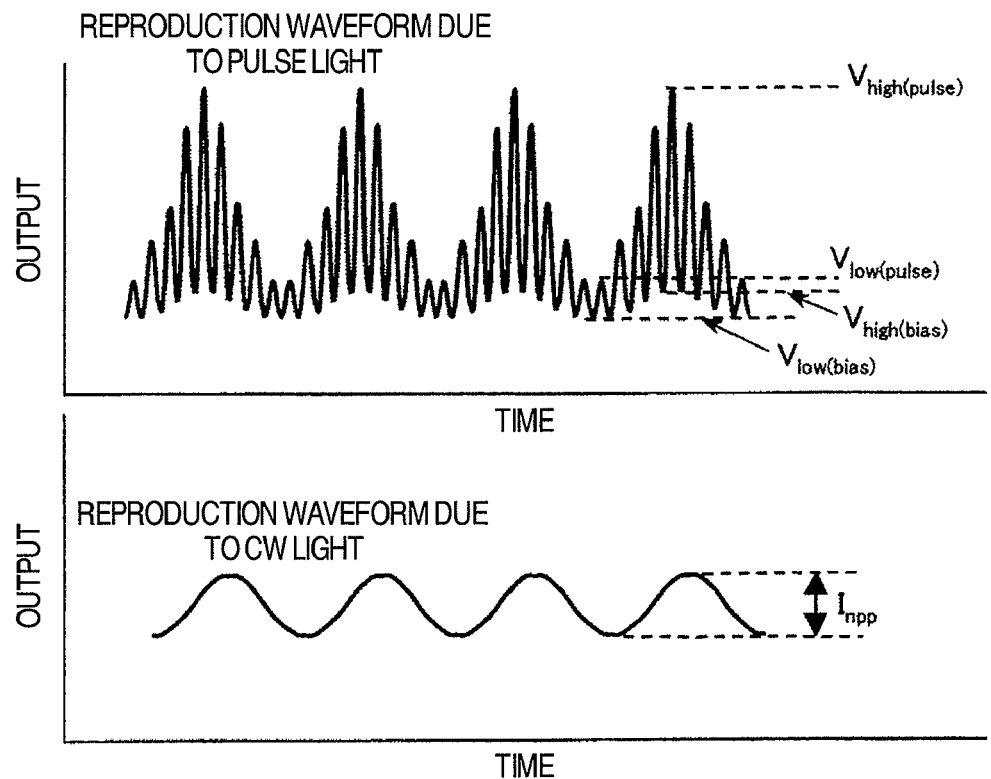
FIG. 4 is a diagram showing the reproduction pattern with the pulse light and CW light.

FIG. 4 schematically shows the reproduction signals for the reproduction of nT marks of a single period with the pulse and the reproduction with the normal CW (continuous wave) light. In the reproduction of nT marks with the pulse light, a plurality of pulses are radiated at each portion when the marks and spaces are passed. In the reproduction with the normal CW light, on the other hand, the output changes continuously with the reflectivity of the marks and spaces.

In the pulse reproduction method according to this embodiment, as shown in FIG. 4, the low and high levels of the pulse emitting portion are designated as $V_{low\ (pulse)}$ and $V_{high\ (pulse)}$, respectively, and the low and high levels of the bias emitting portion with no pulse radiation as $V_{low\ (bias)}$ and $V_{high\ (bias)}$, respectively. Thus, the amplitude $I_{npp}$ is defined by Equation (4).

$$I_{npp}=(V_{high(pulse)}-V_{high(bias)})-a(V_{low(pulse)}-V_{low(bias)}) \quad (4)$$

Figure 7:
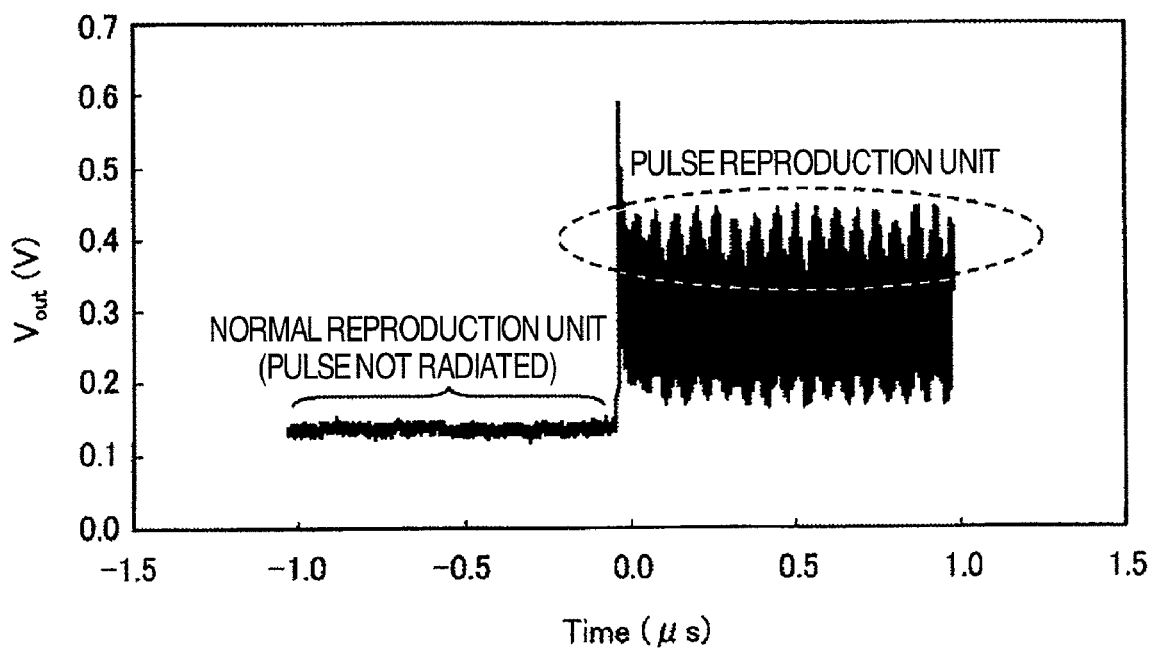
FIG. 7 is a diagram showing the data of the reproduction output of the normal reproducing unit and the pulse reproducing unit.

FIG. 7 shows the RF signal waveform of the 2T marks measured using the pulse reproduction method. The abscissa represents the time and the ordinate the output ($V_{out}$). The pulse light is radiated from time point 0, and for the time before 0, the reproduction waveform of the CW light is shown. The peak power $P_w$ of the pulse light was set to 8 mW, and the base power $P_b$ and the reproduction power Pr with the CW light were set to 0.8 mW. Under this condition, the reproduction amplitude from the 2T marks was not substantially observed from the reproduction waveform of CW light, while the signal amplitude of the 2T marks was clearly observed in the pulse reproduction unit. This is considered to indicate that the pulse light radiation strongly excites the super resolution film of $Fe_2O_3$—$Ga_2O_3$ into super resolution state for an improved resolution. The pulse light emission time is about 3 ns, and therefore, the response speed of the $Fe_2O_3$—$Ga_2O_3$ super resolution film is not more than 3 ns, thereby indicating that the change in refractive index follows the rise of the pulse light.

Figure 8:
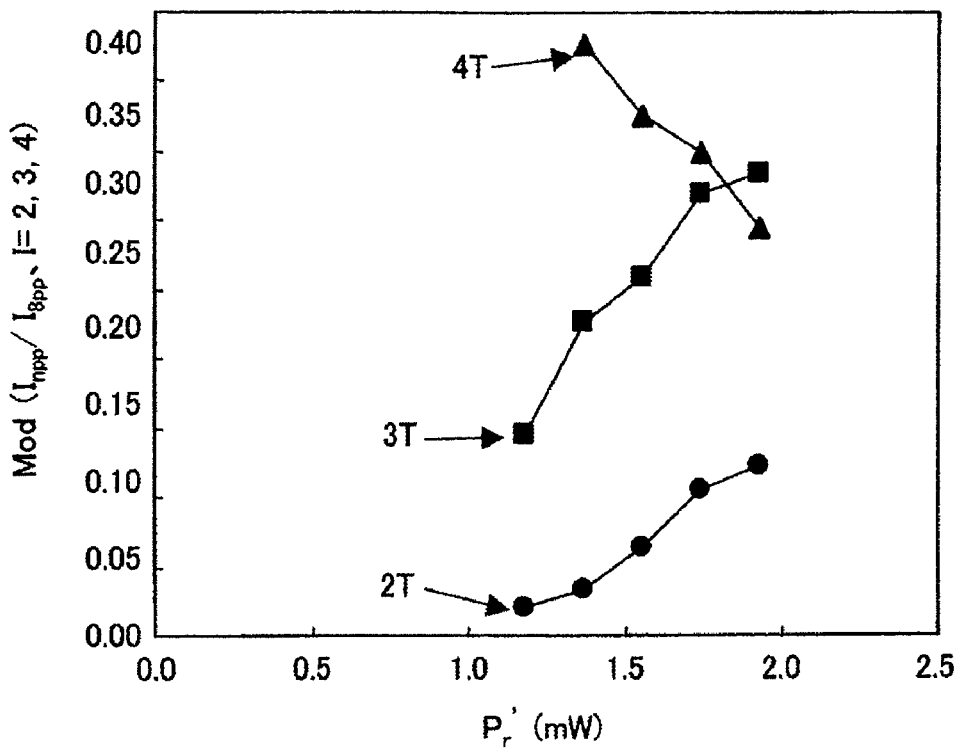
FIG. 8 is a diagram showing the change of the resolution of 2T, 3T and 4T marks with Pr'.

A similar evaluation was conducted also for the 3T and 4T marks. The dependency of the resolution obtained from the pulse reproduction waveform of 2T, 3T and 4T marks on the effective reproduction power Pr' is shown in FIG. 8. In this embodiment, the constant a shown in Equation (4) was determined for each of 2T, 3T and 4T marks. Then, the resolution was maximized at 1.52 for 2T, 1.36 for 3T and 1.27 for 4T. In the study below, an example of calculation using these values as the constants in Equation (4) is described.

With 2T mark, the resolution for Pr' of 2.0 mW is about 5.8 times higher than for Pr' of 1.4 mW, and the resolution was remarkably improved as compared with the reproduction waveform for the CW light. Similarly, as for the 3T mark, the resolution was improved 2.5 times. The resolution of the 2T marks for Pr' of 2.0 mW was substantially the same as that of the 3T marks for Pr' of 1.2 mW, indicating that the resolution along the linear density was improved about 1.5 times.

Figure 9:
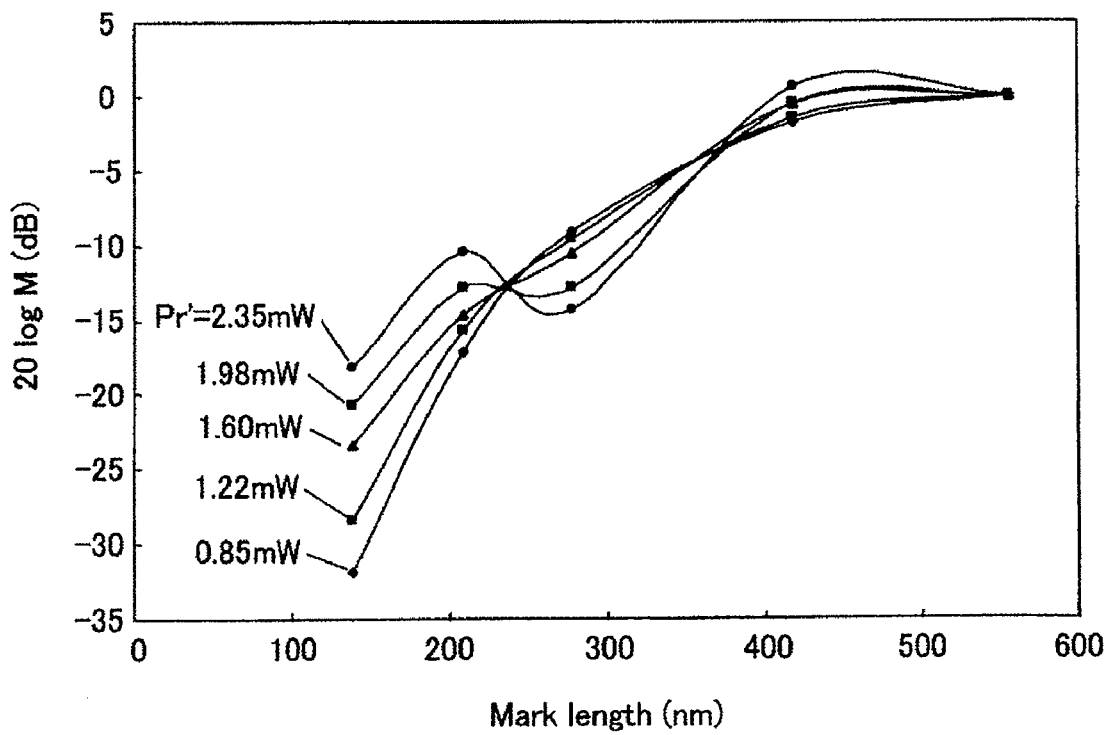
FIG. 9 is a diagram in which the logarithm of the resolution against the length (T) of each mark is plotted.

The resolution of the 4T marks, on the other hand, was reduced with the increase in Pr'. To analyze this phenomenon, the resolution for each mark length (T) was plotted, as the result thereof is shown in FIG. 9. In FIG. 9, the ordinate represents the logarithm (dB) of the resolution and the abscissa the mark length. In the case where Pr' is low, the resolution decreases monotonically with the decrease in mark length. With the increase in Pr', however, the modulation degree increases in the area of the mark length of not more than 243 nm. Especially, it was found that the resolution conspicuously increases in the neighborhood of 139 nm corresponding to the 2T marks. In some part of the mark length range of 243 nm to 380 nm, on the other hand, the resolution was seen to decrease with the increase in Pr.

Figure 10:
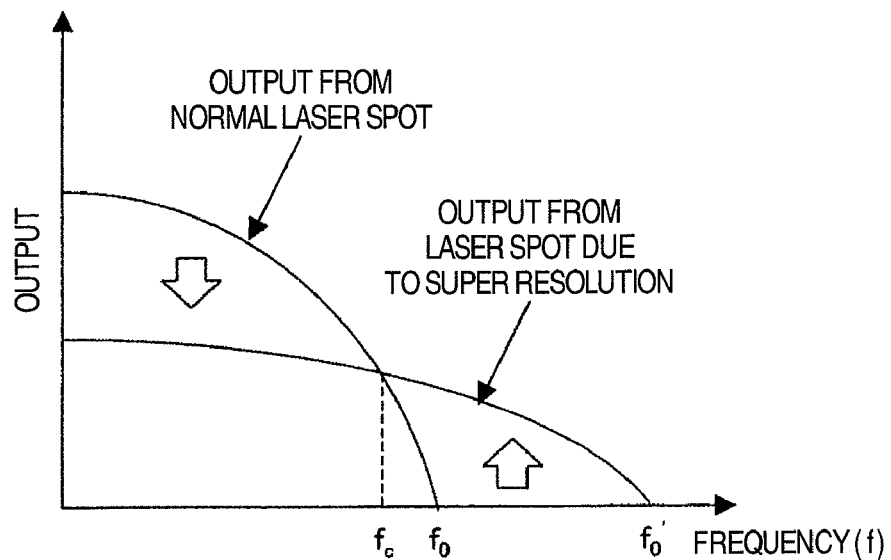
FIG. 10 is a schematic diagram showing the frequency dependency of the reproduction signal intensity in super resolution state.

The beam spot obtained by the super resolution effect is given as the sum of the normal laser spot not in super resolution state and the laser spot in super resolution state. The frequency dependency of the reproduction signal intensity obtained by these beams is shown in the schematic diagram of FIG. 10. The reproduction output of the laser spot in super resolution state, though smaller than that of the normal laser beam, has a smaller diameter for an improved resolution and has a high output up to the high frequency side. Thus, the cutoff frequency increases from fo to fo'. In the front aperture method, the mask is formed by reduction in reflectivity, and therefore the contribution of the laser spot in super resolution state is negative. In the super resolution state, therefore, the output on low frequency side is lower than in the normal reproduction.

On the high frequency side, on the other hand, the output from the normal laser beam is 0 on the frequency side higher than the cutoff frequency fo. The output due to the super resolution spot, however, becomes conspicuous and improved. The boundary between the output decrease on the low frequency side and the output improvement on the high frequency side is considered fc.

The result of the experiment shown in FIG. 9 indicates that the mark length corresponding to fc is 243 nm or substantially equal to one half of the laser beam spot diameter. In the case where the mark size is not less than one half of the laser spot diameter, the signal can be separated even with the normal spot diameter having no super resolution effect, and therefore the amount of the reflected light is conspicuously reduced by the decrease in the laser spot size due to the super resolution phenomenon, thereby probably resulting in a reduced resolution. In the case where the mark size is smaller than one half of the diameter of the normal spot, on the other hand, more than two marks can be contained in the spot, and therefore, the resolution would be reduced. In view of the fact that the super resolution effect reduces the laser spot size and the number of marks in the spots is reduced to less than two, thereby probably resulting in an improved resolution.

Figure 11:
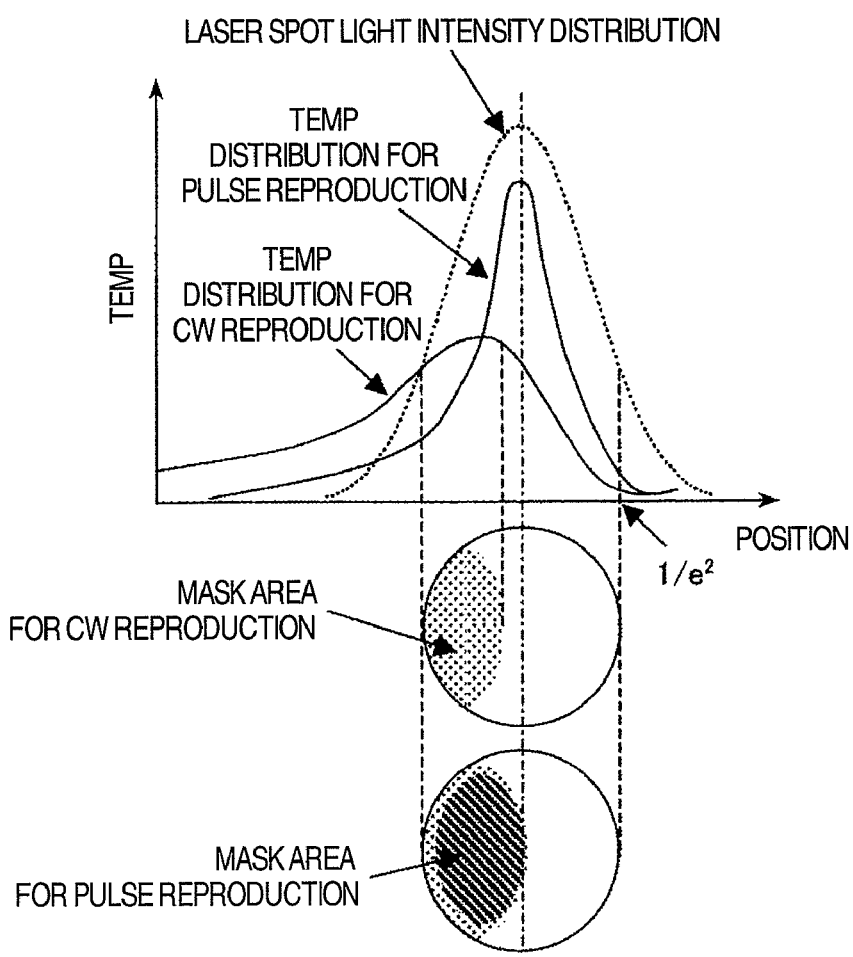
FIG. 11 is a schematic diagram showing a temperature profile on the disk film surface and an optical mask formed in the case where the optical disk having the super resolution effect is reproduced by the CW light and the pulse light.

Next, the reason why the reproduction method using the pulse light is higher in super resolution effect than the CW reproduction is explained. FIG. 11 is a schematic diagram showing a temperature profile on the disk film surface and an optical mask formed in the reproduction of the optical disk having the super resolution effect with the CW light and the pulse light. In the schematic diagram showing the temperature profile in the upper part of FIG. 11, the abscissa represents the position on the circumference of the disk, and the ordinate the temperature on the film surface. The laser spot is moved to positive from negative side in the drawing. When viewed in an arbitrary time section as shown in the drawing, the light intensity distribution of the laser spot constitutes a Gaussian distribution with the center at position ro. Also, the schematic diagram of the optical mask at the position corresponding to the temperature profile is shown in the lower part of FIG. 11. This diagram shows a case in which the higher the temperature, the lower the reflectivity. The method shown in this diagram, in which the rear part of the laser beam is masked while the front window is opened in the shape of a mask, is called the "front aperture detection method".

In the case where the CW light is radiated, the fact that the laser spot position is moved from negative to positive side increases the temperature of the film surface due to the continuous laser light radiation and decreases the temperature with the decrease in the laser light intensity. The resulting shape has a tail on negative side. In accordance with this temperature distribution, the optical constants of the super resolution film change and the reflectivity decreases. Thus, the negative area of the laser spot is masked thereby to reduce the effective diameter of the laser spot.

The pulse laser light, on the other hand, is not radiated continuously as long as the pulse light emission period is sufficiently long as compared with the pulse moving time, and therefore, the tail on negative side is very small as compared with the CW light, thereby producing a temperature profile approximate to the Gaussian distribution. Also, the laser light is radiated for so short a length of time that the specimen is thermally damaged only slightly, and therefore, the peak intensity of the laser light can be increased. As a result, the local temperature at the pulse peak position can be increased.

Generally, the higher the temperature, the larger the amount of change in the optical constants of the super resolution material, and therefore, as compared with the CW reproduction, the reflectivity change is considered large. Thus, the reflectivity of the mask portion can be reduced and a super resolution laser spot larger in contrast is considered possible to form.

The foregoing description concerns an embodiment implemented using the arithmetic method shown in FIGS. 15A, 15B, 15C. The arithmetic process using the method shown in FIGS. 16, 17A, 17B in similar fashion could produce as high a super resolution effect as in FIGS. 15A, 15B, 15C.

Embodiment 2

Figure 12:
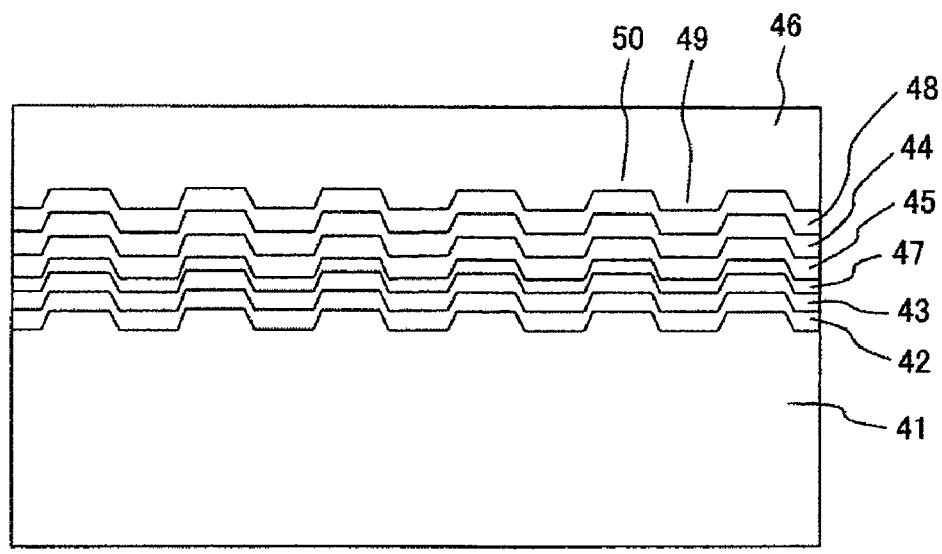
FIG. 12 is a sectional view schematically showing the recording-type optical information recording medium fabricated by the method according to the invention.

Next, the recording-type disk was similarly studied. A sectional view of the recording-type optical information recording medium thus fabricated is shown in FIG. 12. In FIG. 12, numeral 41 designates a substrate, numeral 42 a reflection layer, numerals 43, 45, 48 protection layers, numeral 44 a super resolution layer, numeral 46 a cover layer, numeral 47 a recording layer, numeral 49 a land, and numeral 50 a groove. In the recording-type optical information recording medium according to this embodiment, the recording layer 47 has the function as an optical information recording layer.

According to this embodiment, a medium structure suitable for the optical system having the laser wavelength of 405 nm and the numerical aperture of 0.85 was realized by using the polycarbonate substrate 41 having the outer diameter of 120 mm$\phi$, the inner diameter of 15 mm$\phi$ and the thickness of 1.1 mm and the cover layer 46 formed of a polycarbonate sheet having the outer diameter of 119.5 mm$\phi$, the inner diameter of 23 mm$\phi$ and the thickness of 0.1 mm. The reproducing laser is focused from the cover layer 46 side for reproduction.

The recording-type disk was fabricated through the process described below. First, a reflection layer 42 of an alloy having the contents of 95% Ag, 2.5% Pd and 2.5% Cu (mol %) was formed on the polycarbonate substrate having spiral lands and grooves on the recording surface thereof. This layer was formed to the thickness of 200 nm by DC magnetron sputtering using the pure Ar gas. The protection films 43, 45 were formed of amorphus having the contents including 80% ZnS and 20% SiO$_2$ (mol %). These films were formed by RF sputtering using the pure Ar gas. Also, the recording film 47 was formed as a phase change recording film of GeSbTe. This film was formed by RF sputtering using the pure Ar gas.

The recording layer 47 constituting the optical information recording layer can be a phase change recording film of AgInSbTe or a metal film of at least selected one of the metal elements including Ag, In, Ge, Sb and Tb as well as a phase change recording film of GeSbTe used in this embodiment. Then, a rewritable recording medium reversibly changeable between amorphous and crystal can be fabricated. Also, in the case where a multilayer recording film with a stack of Si and an alloy containing Cu is used, the two elements are mixed by the radiation of the recording laser. and therefore, a stable WORM (write-once-read-many) recording medium can be fabricated.

After sputtering the aforementioned layers, the cover layer 46 was formed. The UV-curable resin was formed by spin coating on the substrate 1.1 mm thick formed with a film, and a polycarbonate cover layer 0.085 mm thick cut into a circle having the outer diameter of 119.5 mm$\phi$ and the inner diameter of 23 mm$\phi$ was attached thereon. The resulting assembly was introduced into a vacuum chamber and while being dearing up to about 1 Pa, the sheet and the substrate were closely attached to each other. The UV-curable resin was cured by radiating the UV light from the cover layer side. The thickness of the UV-curable resin was adjusted to the total thickness of 0.1 mm including the UV-curable resin and the cover layer.

According to this embodiment, the polycarbonate substrate 1.1 mm thick was used as the substrate 41. This substrate 1 has the outer diameter of 120 mm and is formed with an inner hole having the inner diameter of 15 mm for a chuck. A guide groove having lands 49 and grooves 50 is formed spirally on this substrate. According to this embodiment, data was recorded only in the grooves 50. The track pitch was set to 320 nm and the groove depth to about 22 nm.

The signal to be recorded is a repetition of recording pits and spaces corresponding to the recording signals of 2T, 3T, . . . , 8T for the clock signal (1T=69.5 nm). Only one type of recording signal is formed on the same track, and different signals are recorded on different tracks. In this case study, the recording pit length of the signal 2T providing the shortest mark is 139 nm, while the recording pit length of the signal 8T providing the longest mark is 556 nm.

Figure 13:
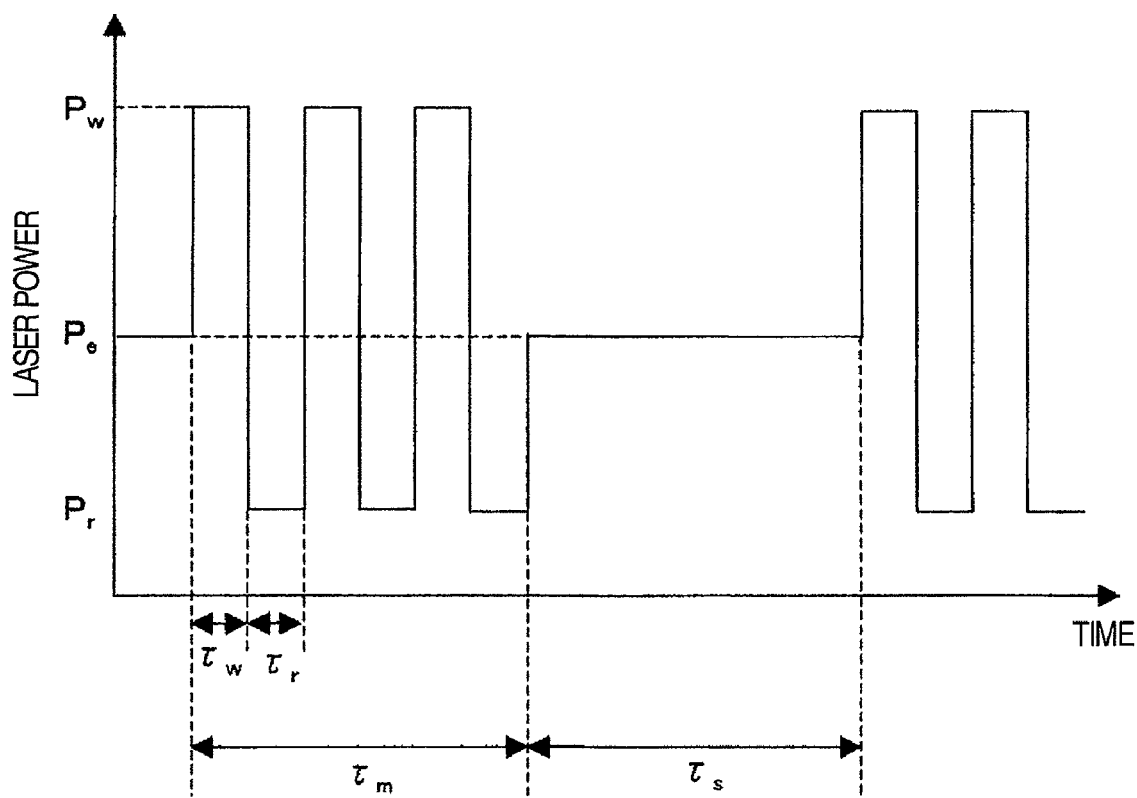
FIG. 13 is a diagram showing an example of the recording waveform for recording in the recording-type optical information recording medium fabricated by the method according to the invention.

FIG. 13 shows an example of the recording waveform used for recording. In order to record a mark, a plurality of pulses are radiated for recording by what is called the multi-pulse method. According to this embodiment, in order to record nT marks, the output of the recording power $P_w$ (mW) for $\tau_w$ seconds and the low output of $P_r$ (mW) for $\tau_r$ seconds were repeatedly radiated in (n−1) pairs to form one recording mark. FIG. 13 shows the case to form 4T marks. With 4T as $\tau_m$, the light of power $P_e$ (mW) was radiated for the same time length $\tau_s$ as $\tau_m$ thereby to record a space. This recording operation was performed for one round of the track having the same radius. According to this embodiment, $P_w$ was set to 7.2 mW, and $P_r$ to 0.1 mW. Also, $P_e$ was set to 4.0 mW.

According to this embodiment, various materials shown in Table 1 were evaluated as the super resolution layer 44.

TABLE 1

|  | No. | Super resolution film composition (mol %) | Resolution CW reproduction | Resolution Pulse reproduction | Resolution ratio (pulse reproduction/ CW reproduction) |
|---|---|---|---|---|---|
| Embodiment | 1 | 100Fe$_2$O$_3$ | 0.02 | 0.12 | 6.00 |
|  | 2 | 100NiO | 0.03 | 0.13 | 4.33 |
|  | 3 | 100CoO | 0.02 | 0.10 | 5.00 |
|  | 4 | 100Co$_3$O$_4$ | 0.03 | 0.12 | 4.00 |
|  | 5 | 100ZnO | 0.03 | 0.13 | 4.33 |
|  | 6 | 100Cr$_2$O$_3$ | 0.02 | 0.11 | 5.50 |
|  | 7 | 78GaN—22InN | 0.03 | 0.12 | 4.00 |

TABLE 1-continued

| No. | | Super resolution film composition (mol %) | Resolution CW reproduction | Resolution Pulse reproduction | Resolution ratio (pulse reproduction/ CW reproduction) |
|---|---|---|---|---|---|
| | 8 | 50Fe$_2$O$_3$—50Ga$_2$O$_3$ | 0.02 | 0.14 | 7.00 |
| | 9 | 49ZnS—51ZnSe | 0.03 | 0.13 | 4.33 |
| Comparative example | 1 | SiO$_2$ | 0.03 | 0.02 | 0.67 |

Table 1 shows the composition of the super resolution film materials studied in this embodiment and the the result of studying the effect of improving, by the pulse reproduction method, the resolution of the 2T mark as compared with the 8T mark. Table 1 shows the resolution at the time of reproduction with the CW light having the reproduction power of 0.5 mW, the resolution at the time of pulse reproduction with the emission power of 6 mW of the pulse emitting portion lower than the recording power and the emission power of 0.5 mW of the bias emitting portion, and the ratio of the resolution for pulse reproduction to the resolution for CW reproduction. A comparative example in which a SiO$_2$ film exhibiting no nonlinearity is formed in place of the super resolution layer 44 is also shown. The resolution is defined as shown by Equation (1).

The first to ninth embodiments show the cases in which Fe$_2$O$_3$, NiO, CoO, CO$_3$O$_4$, ZnO, 78% GaN and 22% InN, 50% Fe$_2$O$_3$ and 50% Ga$_2$O$_3$, Cr$_2$O$_3$, 49% ZnS and 51% ZnSe and Ga$_2$O$_3$ are formed, respectively, as the super resolution layer 44. In all the cases, the resolution for pulse reproduction is very high as compared with that for the CW reproduction. Also, the resolution ratio of the pulse reproduction to the CW reproduction was as large as 4.0 to 7.0. Especially, the resolution ratio for the thin film of 50% Fe$_2$O$_3$ and 50% Ga$_2$O$_3$ formed as a super resolution layer was a very large 7.0. In the case where SiO$_2$ is formed as a comparative example, on the other hand, the resolution substantially remains the same for CW and pulse reproduction, although the resolution for pulse reproduction was slightly lower in the case under consideration.

As described above, an optical disk having a high resolution can be obtained by reproducing, using the pulse reproduction method, the optical information recording medium formed with the super resolution film material according to the invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording and reproducing apparatus for recording and reproducing information onto and from an optical information recording medium which includes at least a substrate, a reflection layer formed on the recording surface of the substrate, an optical information recording layer, a super resolution layer having a complex refractive index reversibly changing with a temperature change, and a protection layer, the apparatus comprising a laser emission control unit for emitting the laser light to record or reproduce the optical information in the optical information recording medium and capable of changing the emission pattern of the laser light, a pickup for radiating by focusing the laser light on the surface of the optical information recording medium and receiving the light reflected from the optical information recording medium, a spindle and a spindle motor for supporting and rotationally driving the optical information recording medium, and a reproduction signal processing unit for arithmetically processing the received signal, wherein the laser light is emitted in pulses by the laser emission control unit, and the reproduction signal processing unit produces a reproduction signal from the result of the arithmetic process using the reproduction signals from the pulse emitting portion and the bias emitting portion of the pulse light.

2. The optical information recording and reproducing apparatus according to claim 1, wherein the arithmetic process produces the difference between the reproduction signal from the pulse emitting portion and a constant multiple of the reproduction signal from the bias emitting portion.

3. The optical information recording and reproducing apparatus according to claim 1, wherein the arithmetic process is executed after determining the reproduction signal of the bias emitting portion for the same time point as the reproduction signal of an arbitrary pulse emitting portion by interpolating the reproduction signals of the bias emitting portions immediately before and after the reproduction signal of the particular arbitrary pulse emitting portion.

4. The optical information recording and reproducing apparatus according to claim 1, wherein the super resolution layer is in super resolution state for the pulse emitting portion but not in super resolution state for the bias emitting portion.

5. The optical information recording and reproducing apparatus according to claim 1 or 4, wherein the super resolution layer contains Fe$_2$O$_3$, Co$_3$O$_4$, NiO, CoO, ZnO, Cr$_2$O$_3$, ZnS—ZnSe, GaN—InN and Ga$_2$O$_3$.

6. The optical information recording and reproducing apparatus according to claim 1, wherein the super resolution layer contains Fe$_2$O$_3$ and Ga$_2$O$_3$.

7. The optical information recording and reproducing apparatus according to claim 1, wherein the optical information recording layer is a metal film configured of at least one metal element selected from Ag, In, Ge, Sb and Te.

* * * * *